(12) United States Patent
Meckenstock et al.

(10) Patent No.: US 8,921,091 B2
(45) Date of Patent: Dec. 30, 2014

(54) METHOD FOR THE DEGRADATION OF POLLUTANTS IN WATER AND/OR SOIL

(75) Inventors: Rainer Meckenstock, Dusslingen (DE); Julian Bosch, Fernhag (DE)

(73) Assignee: Helmholtz Zentrum Munchen Deutsches Forschungszentrum fur Gesundheit und Unwelt GmbH, Neuherberg (DE)

( * ) Notice: Subject to any disclaimer, the term of this patent is extended or adjusted under 35 U.S.C. 154(b) by 619 days.

(21) Appl. No.: 13/061,587

(22) PCT Filed: Aug. 31, 2009

(86) PCT No.: PCT/EP2009/006296
§ 371 (c)(1),
(2), (4) Date: Aug. 1, 2011

(87) PCT Pub. No.: WO2010/022983
PCT Pub. Date: Mar. 4, 2010

(65) Prior Publication Data
US 2011/0275878 A1    Nov. 10, 2011

(30) Foreign Application Priority Data
Sep. 1, 2008 (EP) .................... 08015396

(51) Int. Cl.
| A62D 3/00 | (2006.01) |
| D06M 16/00 | (2006.01) |
| A62D 3/38 | (2007.01) |
| B09C 1/00 | (2006.01) |
| C02F 3/28 | (2006.01) |
| B09C 1/08 | (2006.01) |
| C02F 1/70 | (2006.01) |
| C02F 103/00 | (2006.01) |
| C02F 101/32 | (2006.01) |
| C02F 103/06 | (2006.01) |
| C02F 101/10 | (2006.01) |

(52) U.S. Cl.
CPC . *C02F 3/286* (2013.01); *C02F 1/70* (2013.01); *C02F 2103/007* (2013.01); *C02F 2101/32* (2013.01); *B09C 1/002* (2013.01); *C02F 2103/06* (2013.01); *B09C 1/08* (2013.01); *C02F 2101/105* (2013.01)
USPC ........ 435/264; 435/262.5; 588/313; 588/264; 252/186.1

(58) Field of Classification Search
None
See application file for complete search history.

(56) References Cited

U.S. PATENT DOCUMENTS

| 5,846,434 | A | * | 12/1998 | Seaman et al. ................ 210/724 |
| 2002/0151602 | A1 | * | 10/2002 | Vance et al. .................... 516/77 |
| 2004/0222151 | A1 | | 11/2004 | Lee et al. ...................... 210/610 |
| 2006/0129019 | A1 | * | 6/2006 | Sasaki et al. .................. 588/313 |
| 2007/0187329 | A1 | * | 8/2007 | Moller et al. ................. 210/670 |

FOREIGN PATENT DOCUMENTS

| EP | 1151807 | 11/2001 |
| EP | 1593729 | 11/2005 |
| EP | 1650168 | 4/2006 |
| EP | 1661864 | 5/2006 |
| WO | WO 00/50345 | 8/2000 |
| WO | WO 03/093179 | 11/2003 |

OTHER PUBLICATIONS

Zhang et al. "The Effect of $Fe^0/Fe^{2+}/Fe^{3+}$ on Nitrobenzene Degradation in the Anaerobic Sludge" Journal of Hazardous Material 2007 143:57-64.

* cited by examiner

*Primary Examiner* — Melvin C Mayes
*Assistant Examiner* — Sheng H Davis
(74) *Attorney, Agent, or Firm* — Licata & Tyrrell P.C.

(57) ABSTRACT

The present invention relates to a method for the degradation of pollutants in water and/or soil. More specific, the present invention relates to a method for the on-site decontamination or re-mediation of water and/or soil which are contaminated with organic compounds. Moreover, the invention relates to a method for forming a barrier against the spreading of a contamination with pollutants within the water and/or soil, especially within groundwater (aquifer). Further, the invention relates to means for use in these methods, and to the production of such means.

8 Claims, 4 Drawing Sheets

METHOD FOR THE DEGRADATION OF POLLUTANTS IN WATER AND/OR SOIL

This application is the national phase under 35 U.S.C. §371 of PCT International Application No. PCT/EP2009/006296, filed Aug. 31, 2009, which claims priority from EP 08015396.8, filed Sep. 1, 2008, the contents of which are incorporated herein by reference in their entireties.

The present invention relates to a method for the degradation of pollutants in water and/or soil. More specific, the present invention relates to a method for the on-site decontamination or re-mediation of water and/or soil which are contaminated with organic compounds. Moreover, the invention relates to a method for forming a barrier against the spreading of a contamination with pollutants within the water and/or soil, especially within groundwater (aquifer). Further, the invention relates to means for use in these methods, and to the production of such means.

BACKGROUND ART

Throughout the world, human activity has resulted in many polluted sites, which are contaminated by organic compounds. Usually, such contamination results where organic compounds can seep into the environment, e.g. into the water and/or soil (ground or sediment), which thus become contaminated by the organic compounds ("environmental pollution"). Unfortunately, the presence of organic compounds as environmental pollutants is not restricted to sites of present or past industrial activity, but may also occur in places of accidental or deliberate release. For example, accidental spills may occur during transport or storage of organic compounds, e.g. by accidental damage of transport vehicles or devices (such as tankers or pipelines) or of transport or storage containers, which might be caused by human action, natural disaster (e.g. earthquake or fire), or disintegration (e.g. by corrosion), or the like, but also because of improper or sloppy handling or disposal, e.g. by utilising unsuitable containers.

The predominant organic compounds found in contaminated sites are hydrocarbon compounds, both aliphatic and aromatic hydrocarbons. Possible sources of such hydrocarbon compounds are, for example, products derived from crude oil, such as petrol, diesel, tar etc. Examples of these hydrocarbon compounds may be liquids themselves, or compositions containing both liquid components and solid components dissolved therein, so that they may seep into the soil and/or groundwater. The overall mobility of such compounds is usually dependent of external factors, such as, the ambient temperature at the site, etc. Moreover, the seeping of hydrocarbon compounds into the soil can be assisted by water flow, for example, by rain or surface water. Once inside the soil, the organic compounds can spread further and may eventually arrive in the groundwater, where further spreading of the pollutant can be assisted by the natural flow within the aquifer, leading to a progressing spreading of the pollution. Since even very small amounts of hydrocarbons can contaminate large amounts of water, which is then unsuitable for consumption by living organisms, such as plants, animals or humans, water and/or soil contaminated with hydrocarbons has to be expensively treated in order to become suitable for consumption.

A common way of treatment is the excavation of contaminated soil, which is then decontaminated off-site. This method requires that large amounts of contaminated soil are moved and subsequently treated (decontaminated). However, if a contamination is not detected immediately and could thus spread, the shear amount of contaminated soil may require the removal of so much soil that the excavation method becomes impractical. And even if the most polluted volume of soil comprising the original source of pollution could be removed, the residual pollutants having spread to adjacent sites might still require the treatment of huge volumes of soil.

Moreover, the contamination might not be accessible from the surface at all, for example, in cases of subsurface sites where the primary source of pollution originates in or below a building (e.g. in case of a leaking fuel oil tank integrated in a building), or in cases where the contamination has spread underneath a structure, such as a building, a street, or the like. Or the pollution might threaten to spread into a sensitive subsurface area, such as, e.g. an aquifer used for water consumption. In such cases, in addition to the removal of the primary source of contamination, it might become necessary to restrict further spreading of the contamination by construing a barrier. One possibility for forming a barrier is the digging of trenches and/or the introduction of impenetrable materials, which, however, might not always be possible for reasons of site accessibility and/or costs.

So far, several methods for the in situ (on-site) remediation of contaminated sites have been developed wherein the polluted sites are treated with various compounds. However, especially in cases of sensitive subsurface sites, such as aquifers used for water consumption, the water protection laws of most countries strongly restrict the nature of compounds which may be used for on-site treatment.

One known method utilises nanoscale metal particles, such as colloidal suspensions of nanoscale metallic particles, which are directly pumped into polluted subsurface sites, where they enhance the reductive dehalogenation of halogenated hydrocarbons. Especially, suspensions of nanoscale particles comprising metallic iron, which is considered to be no hazard to sensitive sites, are used for the in situ remediation of sites polluted with halogenated hydrocarbons, as described, for example by W. Zhang in Journal of Nanoparticle Research 5: 323-332, 2003. A method of making and using nanoscale metal for the in situ environmental remediation of chlorinated solvents is also described in U.S. Pat. No. 6,777,449 B2 and U.S. Pat. No. 7,301,066 B2. These methods are suitable for the reductive dehalogenation of halogenated hydrocarbons, but not for the remediation of sites polluted with hydrocarbons which cannot be degraded by reductive means, such as, for example, aliphatic hydrocarbons. Moreover, U.S. Pat. No. 5,857,810 A1 describes the use of a suspension of solid particles including metallic iron colloids for the formation of an in-situ chemical barrier. However, these chemical methods rely on the reductive degradation of pollutants, such as halogenated hydrocarbons, by using metallic reagents, such as iron metal, which are highly sensitive against oxidative degradation themselves. Thus, these methods might require to introduce large amounts of the respective metallic reagents into the sites to be treated. Moreover, they also result in hydrocarbon compounds which can be considered pollutants too. Additional to these methods for the reductive degradation of pollutants, U.S. Pat. No. 5,741,427 A1 describes a method for the in situ remediation of soil and/or groundwater by adding an oxidizing agent and a metal catalyst. However, owing to the unfavourable electron balance, this chemical method also requires the use of large amounts of the respective compounds to be brought into the sites to be treated, thus increasing its costs.

It is known that certain indigenous micro-organisms are capable of the oxidative degradation of hydrocarbon pollutants under anaerobic conditions. For example, the ubiquitous bacteria *Geobacter sulfurreducens*, *Geobacter Grbiciae*, *Shewanella alga*, *Shewanella putrefaciens*, and the like are known to accumulate at sites of hydrocarbon contamination, as they can use aliphatic or aromatic hydrocarbon compounds as carbon sources under anaerobic conditions. It is also known that these bacteria can use ferric iron oxides, which are usually present in the soil or sediment matrix, as a respiratory equivalent (electron acceptor) under anaerobic conditions (cf. e.g. E. E. Roden and J. M. Zachara, Environ. Sci. Technol. 1996, 30, 1618-1628). However, the biological or bacterial degradation of pollutants usually occurs on a very slow time scale. This seems to be caused by the limited accessibility of the iron oxide minerals which are generally insoluble under environmental conditions.

Therefore, it is an object of the present invention to provide a method for the biological remediation of polluted sites, wherein the method should be versatile, universally applicable, easy to use and cost-efficient, without requiring to further strain the already polluted environment. Moreover, it is another object of the present invention to provide a method for forming a barrier against the further spreading of a contamination. Finally, it is an object of the invention to provide the means for use in these methods and for the production of such means.

SHORT DESCRIPTION OF THE INVENTION

The inventors of the present invention have conducted intensive studies in order to solve the problems of the present invention. In order to solve the object of the invention, the present invention provides the following five aspects.

In a first aspect, the present invention provides a method for the degradation of pollutants in water and/or soil, wherein colloidal particles comprising at least one metal oxide are used to oxidise the pollutants.

In a second aspect, the present invention provides a use of the method according to the first aspect for the decontamination of pollutants in water and/or soil, which comprises the stimulation of the biological oxidation of the pollutants.

In a third aspect, the present invention provides a use of the method according to the first aspect for the formation of a biobarrier in water and/or soil, especially in an aquifer or in a sediment.

In a fourth aspect, the present invention provides a colloidal suspension that can be used in the first, second or third aspect of the present invention.

In a fifth aspect, the present invention provides a method for the production of a colloidal suspension according to the fourth aspect of the present invention.

DETAILED DESCRIPTION OF THE INVENTION

The present invention provides a method for the degradation of pollutants in water and/or soil wherein colloidal particles comprising at least one metal oxide are used to oxidise the pollutants.

In the present invention, the term "pollutant" means an organic compound. The term "pollutant" may refer to one specific organic compound, or to a mixture comprising more than one organic compound. A preferred organic compound is, for example, a hydrocarbon, either aliphatic or aromatic, which may optionally be substituted ("functionalized"), such as, for example, partially halogenated, oxidised etc. Preferably, the pollutant comprises at least one hydrocarbon, more preferred one to fifty different hydrocarbons, and most preferred one to thirty hydrocarbons. These hydrocarbon compounds may be liquids themselves or compositions containing both liquid and solid components. Preferred hydrocarbon compounds are, for example, products derived from crude oil, such as petroleum, diesel, tar oil etc. A preferred example for hydrocarbon compounds are the so-called BTEX compounds, wherein BTEX is an acronym used for the compounds benzene, toluene, ethylbenzene, and xylene. In this invention, the term "BTEX hydrocarbons" may also refer to related compounds, such as, for example, substituted cresols. However, a person skilled in the art will realise that the present invention is not restricted to the compounds given as examples in the above, but is suitable for use with any organic compound that is biologically degradable with metal oxides as electron acceptors under anaerobic or iron-reducing conditions. Preferred examples for pollutants are saturated aliphatic compounds, such as, for example, alkanes, either straight-chain or branched, cycloalkanes, or the like, unsaturated aliphatic compounds, such as, for example, alkenes or alkines, both either straight-chain or branched, cycloalkenes, cycloalkines, or the like, wherein the compounds may be functionalized etc. Also preferred are partially oxidised compounds, such as, for example, alkohols, cresols, and the like, or carbon acids, or the like. Also preferred are compounds comprising heteroatoms, such as, for example, heterocyclic aliphatic or aromatic compounds comprising one or more heteroatom selected from the group comprising nitrogen, oxygen, and sulphur, or the like.

In the present invention, the term "degradation of pollutants in water and/or soil" means a chemical or biochemical reaction, by which a pollutant is degraded in water and/or soil. A pollutant may be degraded by an oxidation or reduction reaction. For example, an aliphatic hydrocarbon may be oxidised to a corresponding alcohol, either the mono- or diol, aldehyde, carbon acid, or the like, and eventually to carbon dioxide. An aromatic hydrocarbon may also be oxidised to a corresponding alcohol, either the mono- or diol, acetate, or the like, and eventually to carbon dioxide, carbonic acid, or the like. In the present invention, a pollutant is degraded by an oxidation reaction. Preferably, the oxidative degradation is a biological degradation, wherein the pollutant is degraded by a micro-organism.

In the present invention, the term "water and/or soil" means water, either in a pure state, such as fresh water or salt water, or water in a mixture with soil, such as groundwater, or soil, either in a dry state, such as sand, or a mixture of water and soil, such as soil saturated with water, for example in an aquifer or in a lake sediment. Furthermore, the term "water and/or soil" refers to all types of aquifers, such as, for example fractured rock or other fractured aquifers, porous aquifers, carst aquifers, and the like.

In the present invention, the term "soil" also means a sediment, such as, for example, a lake sediment, sea sediment, or the like. Especially, soil and sediment both mean all types of solid matrix which can conduct water, if a hydrological gradient is present or applied. Soil and sediment refers to porous media or matrices. In the art, aquifers, which are considered as conductive media, are known to be either carst, fractured, sedimentary or other aquifers.

Preferably, the term "water and/or soil" refers to a mixture of water and soil. Examples for the mixture of water and soil are an aquifer (groundwater), a sediment, such as a lake bottom or a sea bottom, a natural or artificial sediment which is part of a water treatment plant or an autonomic water purification system, or of a microbial fuel cell. Examples for the use of sediments used in water treatment plants are the production or recovery of potable water from surface or waste water, for example by bank filtration, domestic or industrial water purification systems, or the like. Autonomous water purification systems are used in remote areas and/or hostile environments, such as, for example, in deserts, in a spacecraft, polar station etc. Preferably, autonomous water purification systems are decentralised water treatment facilities, or other types of water treatment with porous media, or the like. In these applications, the present invention also enhances the phosphate elimination by precipitation or adsorption of phosphate to the metal oxide materials used. Furthermore, the invention also allows to produce a conductive layer which allows to stimulate denitrification with electrical systems as electron supply. Especially preferred, the mixture of water and soil is an aquifer (groundwater) or a sediment.

In the present invention, the term "at least one metal oxide" means a compound or a particle comprising one or more metal oxides, preferably one to three metal oxides, further preferred one or two metal oxides. Herein, the term "metal oxide" means metal oxides, which comprise metal cations and the oxide anion ($O^{2-}$). The term "metal oxide" also means metal hydroxyoxides, metal hydroxides, or the like. The metal cations may be cations derived from any metallic element of the periodic table, particularly any metallic main group element or any element of the transition metals. A metal cation is obtained by oxidation of the corresponding metal atom. A metal cation may have any oxidation state from +1 to +7. Preferably, a metal cation has an oxidation state from +2 to +7, further preferred from +2 to +4, still further preferred an oxidation state of +2 or +3, and especially preferred an oxidation state of +3. The metal oxide particles of the present invention are usually composed from metal cations and oxide anions only, but they may comprise other anions such as, for example, halogenide (halide) anions, such as fluoride ($F^-$), chloride ($Cl^-$), bromide ($Br^-$) or the like, or other oxygen based anions, such as peroxide ($O_2^{2-}$), hydroxide ($OH^-$) or the like, or composed anions, such as sulphate ($SO_4^{2-}$), phosphate ($PO_4^{3-}$) or the like. Preferred examples are metal hydroxyoxides or metal hydroxyoxides/halides. In particular, the metal oxide particles may comprise such other anions on the surface of the particle, either in form of single other anion(s) attached to the surface, or in form of one or more layers of such other anions covering the particle surface, either partially or completely. For example, a metal oxide particle in an aqueous environment and/or originating from an aqueous environment usually comprises hydroxide anions on its surface. In an aqueous environment, the degree of surface coverage by hydroxide anions is dependent on the proton concentration of the aqueous environment, i.e. its pH value. Usually, the degree of surface coverage, i.e. the number of hydroxide anions, increases with a decreasing pH value, i.e. a higher proton concentration. In an aqueous environment, a metal oxide particle, or its surface, respectively, is in ionic equilibrium with the surroundings. The metal oxide particles in an aqueous environment are mostly electroneutral, i.e. their net electric charge is within a range of −5 to +5, preferably within a range of −3 to +3, more preferred within a range of −2 to +2, and especially preferred −1, or +1, or about zero. In case of a saline environment, a metal oxide particle may also comprise chloride anions or other anions on its surface.

According to the present invention, a metal oxide particle is either a single crystal of the respective metal oxide, or composed of a multi-crystal structure of the respective metal oxide, such as, for example, an aggregate, agglomerate or conglomerate, composed of several crystalline components. Preferably, the metal oxide particle is stable in the application form used in the method of the present invention, especially in a colloidal solution, and does neither decompose nor form further aggregates, agglomerates or conglomerates. When applied to the environment, the metal oxide particle may undergo changes in the physical and chemical state, which are distinct from the application form. Examples for such changes are aggregation, especially with soil or sediment particles, adsorption, especially on soil or sediment particles, precipitation, coagulation, or the like. The metal oxide particle may have any shape, either predetermined by the shape of a single crystal, or by the shape of the aggregate, agglomerate or conglomerate. Preferably, the shape of the metal oxide particle is spherical, cubic, rhombic, hexagonal, or an aggregate of smaller particles or crystals. Preferably, the particle is a stable dispersed particle or aggregate, which can be monodisperse crystals or aggregates of smaller particles. In the present invention, a particle consisting of an aggregate of smaller particles does not form further aggregates. The metal oxide particles may comprise particles with more than one of the above shape.

In the present invention, the term "colloidal particles comprising at least one metal oxide" means a dispersion of the metal oxide particles in a liquid dispergant. Sometimes, this dispersion is also referred to as a colloidal suspension or a colloid. The liquid dispergant may be any suitable dispergant for dispersing the metal oxide particles. Preferred liquid dispergants are water, alcohols, such as ethanol, methanol and the like, as well as mixtures thereof. These dispergants may have different pH values and/or salt concentrations. Preferably, the liquid dispergant comprises water. Especially preferred, the dispergant is water. Here, water means water at different pH and/or having different salt concentrations. If water is used as dispergant, the stability of the colloidal suspension is dependant on the proton concentration or pH value of the suspension medium. Preferably, the pH value of the medium is from 6.5 to 9.0, further preferred from 7.0 to 8.5, still further preferred from 7.5 to 8.0, and most preferred about 8.0. It was found that colloidal suspensions having these pH values are especially stable. Here, the term "stable" means that the colloidal suspension does not show a coagulation of the dispersed particles. Moreover, the stable colloidal suspension was found to remain in the colloidal state without requiring either mechanical means, such as, for example, stirring, shaking or the like, or additives, such as, for example, dispersion agents, or the like. It was found that a stable particle may be either monodisperse or an aggregate of smaller particles, which does not aggregate further.

Preferably, the colloidal suspension comprises additional components which are used to adjust properties such as, for example, the pH value, the ionic strength, or the like, of the colloidal suspension. Advantageously, by adjusting these properties of the colloidal suspension, it is possible to adjust the surface features of the colloidal particles, such as, for example, the surface charge of the particles, their zeta-potential, their pKa value, or the like, which all contribute to the environmental behaviour of the particles, for example, govern the transport and adsorption properties of the particles. Thus, by adjusting these properties, it is possible to adjust the intended spreading of the particle in the porous media, especially, the mobility of the particles in the water and/or soil. Furthermore, adjusting of the surface properties will allow for the adsorption of the particles to the matrix after a certain intended travel distance. Furthermore, the surface properties are adjusted to provide the optimal reactivity towards microbial reduction. Preferably, the ionic strength of the suspension is adjusted by dialysis, dilution, desalting with chromatograpic or ion exchange methods and other means suitable for reducing the ionic strength.

Overall, the colloidal suspension (dispersion) of colloidal metal oxide particles according to the present invention shows the physical properties of the dispergant so that the dispersion is liquid and basically behaves like a solution of the metal oxide particles. This means, the colloidal suspension of the metal oxide particles may be stored and transported like a liquid, e.g. by pouring, pumping etc.

Preferably, the colloidal suspension comprising the metal oxide particles is a stable dispersion of the metal oxide particles in the dispergant (stable state). Here, a stable dispersion means a dispersion which does not change its state or its physical properties for at least one month, preferably for at least two months, and especially preferred for at least three months. Especially preferred is a suspension of metal oxide particles which is stable for at least three months It was found that the method according to the present invention produces excellent results in the oxidative degradation of pollutants in water and/or soil. Surprisingly, it was found that especially the anaerobic degradation of pollutants by iron-reducing micro-organisms is strongly enhanced by stimulating the respiration activity. The colloidal particles according to the present invention are up to three hundredfold faster reducible than bulk iron oxides present in the water and/or soil. It is presumed that the metal oxide colloids serve as electron acceptors for anaerobic respiration. Moreover, the colloidal particles exhibit a surprising catalytic effect as electron shuttles to the solid electron accepting ferric oxide phases. So it was found that adding colloids according to the present invention strongly enhances the usually kinetically inhibited reduction of solid bulk iron oxides. Furthermore, the total amount of iron oxides available for bacterial reduction is highly enhanced by the addition of metal oxide colloids according to the present invention, especially, by adding iron oxide colloids. It is presumed that the colloids become adsorbed in this state and thereby activate the surface of the bulk iron oxides present in the water and/or soil, thereby increasing their bioavailability. Surprisingly, it was found that the method according to the present invention advantageously enhances the microbial activity in the water and/or soil also for metal oxides, which are usually not bioavailable for micro-organisms, such as, for example, iron oxide minerals such as goethite and hematite, thus providing an increased biological degradation of the pollutants. It was found to be especially advantageous that, by activating and using the additional electron acceptor capability of the bulk metal oxide material present in the water and/or soil, the method according to the present invention allows for the oxidation of much more pollutants than could be oxidised by the added colloid alone (excess electron acceptor capability).

Moreover, the colloidal suspension comprising colloidal metal oxide particles used in the inventive method allows for an easy handling of the metal oxide particles. Advantageously, the colloid comprising the metal oxide particles may be introduced into the water and/or soil comprising the pollutants by means of passive or active transport reactions, for example, by passive or active infiltration. For example, in the case of water, the two fluid components water and colloid may be simply combined or mixed. Preferably, the mixing is assisted by means of stirring, shaking, or the like. In the case of soil, the fluid property of the colloid allows for adding the colloid to the solid soil, or vice versa. This may, for example, be carried out by pouring the liquid colloid onto the soil in situ, or by adding the soil to a container, or the like, which comprises the colloid, preferably assisted by mixing, such as, for example, stirring or shaking. A similar procedure may also be carried out in the case of a mixture of water and soil already present, such as, for example, in a water treatment or purification plant, or system, or the like. In the case of water and soil, for example in form of a sediment or aquifer, the colloid may be transported to the site comprising the pollutant by means of passive transport, for example by natural groundwater flow, or by means of active transport, for example by directly pumping the colloid into the subsurface of the polluted site. Advantageously, this method allows to reach obstructed sites of polluted soil in situ, without carrying out major work in order to allow access to the sites.

The colloids can thereby be introduced directly at the preferred site of biodegration and create a biobarrier where the oxidation of the pollutants takes place. A further advantage is that the biobarrier will form in the most conductive areas of the aquifer as the water-colloid mix will preferably infiltrate or pass through the most conductive flow paths. As the most conductive flow paths are also the sites where the pollutants are transported, the colloids will be directly pumped to the preferred points of bioremediation, adsorb there and serve as electron acceptors and as electron shuttles to the matrix.

Preferably, the metal oxide particles comprise a metal oxide comprising a metal abundant in the natural environment of the water and/or soil. Examples for abundant metals are iron, aluminium, titanium, manganese, silicon, cobalt, nickel and the like. Preferably, the metal oxide particles comprise metals selected from the group consisting of iron, aluminium, titanium, manganese, silicon, cobalt, and nickel. However, the metal oxide may also comprise other elements as impurities, especially, if the metal oxide in obtained from natural sources. It was found that metal oxide particles comprising any one of these metal oxides are particularly suitable for use in the present invention because they form especially stable colloids. Moreover, the metal oxide particles comprising these metal oxides are easily available and are non-toxic, i.e. they do not pollute the water and/or soil further. In fact, such metal oxides are known to be part of natural soil or sediments.

Preferably, the metal oxide particles comprise an iron oxide or a mixed oxide comprising iron oxide and at least one of the group consisting of aluminium oxide, manganese oxide, and silicon oxide. Especially preferred are pure iron oxides, pure manganese oxides, mixed iron-manganese oxides, as well as mixtures thereof with silicon oxides or aluminium/silicon oxides (aluminium silicates).

Preferred examples for iron oxides are naturally occurring iron oxides (referred to as natural iron oxides in the following) and synthetic iron oxides. In iron oxides, the iron cation usually has an oxidation state of +2 or +3. In this invention, the term "iron oxide" refers to iron oxides as well as to iron oxyhydroxides and iron oxide-hydroxide/chlorides, in which part of the oxide anions are replaced by hydroxide anions, or hydroxide and chloride anions, respectively. There are numerous examples of known iron oxides or iron oxyhydroxides, which comprise iron cations in the oxidation state +2 only, or which comprise iron cations in the oxidation state +3 only, or which comprise iron cations in both the oxidation states +2 and +3. Preferred are ferric iron oxides which comprise iron cations in the oxidation state +3, and especially preferred are ferric iron oxides which comprise iron cations in the oxidation state +3 only. Preferred iron oxides consist of synthetic or natural iron oxides which are either synthesized de nuovo or produced from natural materials. Such natural materials can be, for example, iron oxides, which are milled to produce particles small enough to produce the stable colloidal suspension according to the present invention. Preferably, natural materials are milled to a particle size of 500 nm or smaller, more preferred 400 nm or smaller, and most preferred to a particle size of from 100 nm to 400 nm. Furthermore, natural colloidal particles can be extracted, concentrated, handled, and used similar to synthetic particles. However, natural metal oxides may require to check for impurity levels. Especially preferred are synthetically produced natural metal oxides.

Preferred examples for natural iron oxides, which comprise iron cations in the oxidation state +3 only, are, for example, hematite ($\alpha$-$Fe_2O_3$), maghemite ($\gamma$-$Fe_2O_3$), goethite ($\alpha$-FeO(OH)), ferrihydrite ($Fe_5HO_8 \cdot 4H_2O$), akaganéite (Fe(III)O(OH,Cl), lepidocrocite ($\gamma$-FeOOH) or the like. Other preferred natural metal oxides are magnetite ($FeO \cdot Fe_2O_3$), and manganese oxide and manganese dioxide minerals. The mineralogical identity of metal oxides can be determined by usual methods, such as, for example by characterization with X-ray diffraction, Mössbauer spectroscopy, LDS or other suitable methods. Preferred examples for synthetic iron oxides are hematite ($\alpha$-$Fe_2O_3$), maghemite ($\gamma$-$Fe_2O_3$), goethite ($\alpha$-FeO(OH)), ferrihydrite ($Fe_5HO_8 \cdot 4H_2O$), akaganéite (Fe(III)O(OH,Cl), lepidocrocite ($\gamma$-FeOOH), magnetite ($FeO \cdot Fe_2O_3$), and manganese oxides and/or dioxides.

It was found that iron oxide particles are particularly suitable for use in the present invention because they form especially stable colloids. Moreover, iron oxide particles are easily available and are non-toxic, i.e. they do not pollute the water and/or soil further. In fact, iron is one of the most abundant elements on earth, and is found in form of iron oxides, at least in traces, in most soils or sediments.

Examples for a mixed oxide comprising iron oxide and at least one of the group consisting of aluminium oxide, manganese oxide, and silicon oxide, are mixed iron-aluminium-oxides, such as smectite, mixed iron-titanium oxides, and mixed iron-manganese oxides. In a preferred embodiment of the present invention, iron oxide particles can be used to provide a coating of iron oxide on the surface of a particle consisting of another oxide, for example a silica particle. Preferably, the iron oxide-coated particles are colloidal particles. Such particles can be advantageously used to enhance the colonisation of soil or sediment, and thus enhance the bioactivity thereof. The colloidal iron oxide particles can also be adjusted so that they form a coating on any matrix particle present in the soil or sediment in situ.

Further preferred, the metal oxide particles comprise an iron oxide. Still further preferred, the metal oxide particles comprise an natural iron oxide, preferably a natural iron oxide comprising iron cations in the oxidation state +3. Further preferred, the metal oxide particles consist of a natural iron oxide comprising iron cations in the oxidation state +3 only. Most preferred, the metal oxide particles consist of one natural iron oxide selected from the group consisting of hematite ($\alpha$-$Fe_2O_3$), maghemite ($\gamma$-$Fe_2O_3$), goethite ($\alpha$-FeO(OH)), ferrihydrite ($Fe_5HO_8 \cdot 4H_2O$), akaganéite (Fe(III)O(OH,Cl), and lepidocrocite ($\gamma$-FeOOH). Also preferred is magnetite ($FeO \cdot Fe_2O_3$). Preferably, the metal oxide particles comprise a metal oxide that has a magnetic property. The metal oxide may be ferromagnetic or ferrimagnetic, preferably the metal oxide is a ferromagnetic metal oxide. Preferred examples for ferromagnetic iron oxides are magnetite or maghemite.

The iron oxide particles may be prepared by known methods. General synthesis methods may be found, for example, in "Iron Oxides in the Lab" by U. Schwertmann and R. M. Cornell, VCH, Weinheim, 1991. However, it was found that especially stable colloidal suspensions of iron oxide particles useful for the present invention were preferably obtained by producing the colloidal particles in situ. Suitable methods for producing such stable colloidal suspensions comprise steps for inducing iron oxide formation in a suitable solution comprising iron ions by means of, for example, adjusting the pH value, adjusting the ionic strength of the solution, heating the solution, irradiating the solution, and the like. Preferably, the pH value is rapidly adjusted to a basic pH value of 8 or higher, more preferred to 10 or higher. Preferably, the ionic strength is adjusted by reducing the ionic strength, preferably by dialysis, dilution, desalting with chromatograpic or ion exchange methods or other means suitable for reducing the ionic strength. Preferably, the heating is carried out at temperatures of 90° C. or higher, more preferred at boiling temperature. Heating may be carried out under increased pressure, preferably in a sealed system. Irradiation may be carried out using a microwave source, which also leads to heating of the solution. The size of the particles is usually dependent from the corresponding growth rates of the individual oxide particles, and may thus be adjusted by reaction time.

Preferably, the metal oxide particles have a particle size of from 1 to 2000 nm. In the present invention the term "particle size" refers to the mean particle size of the metal oxide particles present in the colloidal suspension. In dependence from the shape of the particle, the particle size refers to the average/largest dimension of either a monodisperse metal oxide crystal alone or an aggregate of particles forming a stable colloid. Examples for metal oxides forming such aggregates are ferrihydrite and goethite, which appear to consist of nanocrystals that aggregate to large although defined particles. In case of spheric particles, the particle size refers to the average/largest diameter of the monodisperse crystal or aggregate, depending on the measuring method used. In particular, the particle size refers to the particle size as determined by dynamic light scattering (DLS) in a diluted aqueous colloidal sample. Further suitable methods for determining the particle size comprise a zeta sizer, electron microscopy and the like. A person skilled in the art will know about the individual methods and their respective advantages. Further preferred, the metal oxide particles have a particle size of from 3 to 2000 nm, still further preferred from 10 to 500 nm, and most preferred from 30 to 300 nm. It was found that metal oxide particles having a particle size of 10 to 500 nm are especially suitable to form the stable colloidal suspension required for the method according to the present invention. Particles larger than 2000 nm do not produce a stable colloid.

In the case of iron oxide particles, it was found that they show an optimum effect in the method of the present invention, if they have a particle size of from 5 to 500 nm, preferably from 30 to 400 nm, and most preferred from 100 to 400 nm. Particularly, in the case of ferrihydrite, goethite, and hematite, it was found that particles with a size of from 100 to 400 nm are especially effective in the method for the degradation of pollutants in water and/or soil according to the present invention. Surprisingly, the bioavailability of the iron oxide particles according to the present invention is independent from the nature of the iron oxide comprised in the colloid. It was found that below a particle size of 500 nm the iron oxide becomes readily available even though the corresponding iron oxide will not be reducible as a bulk phase.

Preferably, in the method according to the present invention, the colloid is brought into contact with the water and/or soil comprising the pollutants by means of mixing, and/or active or passive transport. For example, in the case of water, the two fluid components water and colloid may be simply combined or mixed. Preferably, the mixing is assisted by means of stirring, or the like. In the case of soil, the fluid property of the colloid allows for adding the colloid to the solid soil, or vice versa. This may, for example, be carried out by pouring the liquid colloid onto the soil in situ, or by adding the soil to a container, or the like, which comprises the colloid, preferably assisted by mixing, such as, for example, stirring. A similar procedure may also be carried out in the case of a mixture of water and soil already present, such as, for example, in a water treatment or purification plant, or system, or the like. In the case of water and soil, for example in form of a sediment or aquifer, the colloid may be transported to the site comprising the pollutant by means of passive transport, for example by natural groundwater flow, or by means of active transport, for example by directly pumping the colloid into the polluted site. Advantageously, this method allows to reach obstructed sites of polluted soil in situ, without carrying out major work in order to allow access to the sites.

Surprisingly, it was found that the addition of the colloid comprising metal oxide particles to water and/or soil comprising pollutants highly enhances the microbial activity in the water and/or soil. In turn, the microbes metabolise the pollutants, which are thereby degraded and removed from the water and/or soil. It is assumed that the colloid comprising metal oxide particles not only acts as an electron acceptor for the microbes, especially in an anaerobic environment that is found, for example, in a subsurface site, but also enhances the availability of other mineral electron acceptors present in the water and/or soil, such as, for example, bulk metal oxide particles. In particular, by enhancing the availability of bulk metal oxide particles as additional electron acceptors, the use of the colloid according to the invention allows to oxidise more pollutant molecules than could be oxidised by the colloidal particles alone. In other words, the colloid comprising metal oxide particles exhibits a catalytic effect in activating the bulk material since a small amount of colloid may activate a much larger amount of bulk material for the biological degradation of the pollutant. Thus, in a preferred embodiment of the invention, the colloidal particles are further used to activate or enhance the availability of other mineral electron acceptors present in the water and/or soil, especially that of bulk metal oxides.

Preferably, the colloid is pumped into the water and/or soil. It was found that pumping of the colloid allows for reaching remote sites of water and/or soil contaminated with pollutants. Thus, it is possible to bring the colloid into contact with remote sites of water and/or soil, such as, for example, deep sea sediments, or aquifer underneath buildings or other structures. Moreover, by adjusting the pressure used for pumping the colloid into the water and/or soil it is possible to increase or decrease the flow velocity of the colloid. This allows for a faster (slower) spreading of the colloid in the water and/or soil, and, consequently, influences the reactivity of the colloid. Moreover, the pumping pressure also influences the immediate spreading of the colloid in the water and/or soil, and thus not only the area or volume accessible from a single point of entry, but also the amount or concentration of colloid provided per volume unit. Preferably, the colloid is pumped into the water and/or soil at a single point, or at more than one point, either simultaneously or successively. The colloid may be pumped into the water and/or soil at 1, 2, 3, 4, 5, or more points. It is also feasible to pump the colloid into the water and/or soil at 10, 20, 30, 40, 50 or more points. The number of points will be selected according to the corresponding conditions.

An example scenario for a preferred use of the inventive method is e.g. a fuel spill comprising aromatic hydrocarbons, which have leaked into the groundwater. Although the mass of the soil contaminated with fuel was already excavated, the residual fuel still present in the subsurface is constantly dissolving into the groundwater, producing a BTEX-plume. The plume is prolonging and has crossed a property boundary, perhaps underneath a valuable structure, such as, for example, a building, street etc., directly demanding remediation action. As the plume is only produced from residual hydrocarbons left after the initial remediation action (excavation), only small local concentrations of aromatic hydrocarbons are expected. In this scenario, the present invention allows the construction of a biobarrier in order to remediate the plume of aromatic hydrocarbons directly in the aquifer (subsurface site). The colloid may be pumped into one or more holes (wells) drilled downstream of the polluted site, with respect to the natural flow of the groundwater, thereby creating a bioactive barrier for the pollutant. The pollutant will then be passively transported with the groundwater flow to the colloid-treated site. It is a further advantage of the colloid that it is stable in the pumping so that it does not block the pumping equipment or the entry holes (wells). Further, by adjusting the properties of the metal oxide particles, it is possible to obtain a colloid having desired properties. Especially, the colloid shall only stay in suspension for a certain time and then naturally adsorb to the aquifer matrix. Thereby, it creates a biobarrier, i.e. a stationary site of enhanced biological activity, where biodegradation of the pollutant takes place, by providing a suitable electron acceptor. The success of the treatment can be monitored in downstream groundwater wells either by monitoring the change of pollutant concentrations or more preferably by compound specific stable isotope analysis.

In another preferred embodiment, the colloids are injected with probes into sediments of lakes or rivers for decontamination. This embodiment does also include enhanced bank filtration used in water treatment. The sediment is punctured with the probe and the colloid suspension is injected through the probe into the sediment. This needs to be performed with adequate pumping rates in order to not fluidise the sediment.

The success of the treatment can be monitored by measuring the concentration of the pollutant itself or by stable isotope fractionation.

In another preferred embodiment, the colloidal suspension is used to remediate sea, lake or river sediments, e.g. after an oil spill. The colloid suspension may be poured onto the unsaturated parts of the shore where it then penetrates the sediment down to the saturated zone. The wave energy will further spread the colloid in the area of the capillary fringe where the pollutants are mostly located. In the sea, lake or river water itself, the colloid is pumped with tubings into the sea, lake or river and released just above the sediment. Due to its high physical density, the colloid suspension spreads on the ground and settles onto the sediment where it can fulfil its electron accepting function. Furthermore, especially iron oxide colloids can function as a phosphorous sink, e.g. removing phosphate from the water, and store phosphorous in the sediment.

In another preferred embodiment, the colloid suspension is used to activate biofilters in decentralised waste water treatment plants. The colloid suspension is poured or pumped into the sand filter where it adsorbs to the exposed surfaces of the sand particles. It thereby activates these surfaces for microorganisms with respect to electron accepting properties but also with respect to colonisation, thus resulting in a preferred forming of biofilms on the surfaces. A preferred function of the colloids is here also the removal of phosphorous from the waste water by chemically binding the phosphorous and precipitating it as an iron-complex. This improves the category of cleaning of the waste water plant. The application here is also a general coating of the surfaces of the matrix with metal oxides.

In a particularly preferred embodiment of the method of the present invention, a colloid comprising iron oxide particles having a particle size of from 1 to 500 nm is brought into contact with water and/or soil comprising a pollutant by means of pumping the colloid into the water and/or soil. More preferred, the particle size of the iron oxide particles is 100 to 400 nm. It was found that these iron oxide particles are especially effective in the present invention.

In another particularly preferred embodiment of the method of the present invention, the indigenous micro-organisms of the water and/or soil are used to fulfil the function of the colloids. This is because metal-reducing organisms are omnipresent in nature and especially in anoxic habitats where they will use the colloids. Preferred examples are bacteria, especially those selected from the group consisting of *Geobacter sulfurreducens* (DSM No.: 12127), *Geobacter Grbiciae*, and *Shewanella putrefaciens*.

In an especially preferred embodiment, the inventive method is used for the formation of a biobarrier in water and/or soil. The term "biobarrier" means a site where the oxidation of the pollutants takes place, which is formed in conductive areas of an aquifer preventing the further spreading of a pollutant therein.

Moreover, the present invention provides a colloidal suspension comprising colloidal particles comprising at least one metal oxide metal oxide for use in the method according of the present invention.

Moreover, the present invention provides a method for the production of a colloidal suspension that can be used in the method according of the present invention. The method for the production of the colloidal suspension comprises at least one step for inducing metal oxide formation in a solution comprising corresponding metal ions, wherein the at least one step for inducing metal oxide formation is selected from adjusting the pH value of the solution, adjusting the ionic strength of the solution, heating the solution, and irradiating the solution.

The present invention will be demonstrated by means of the following examples, which should however not be understood to limit the scope of the present invention in any way.

EXAMPLES

Example 1

Synthesis and Analysis of Colloidal Iron Oxides

Synthesis of Colloidal Iron Oxides

Colloidal ferrihydrite (336 nm diameter) was synthesized by dissolving 0.1M ferric citrate and adjusting the solution to a pH value of 8.0 by adding a 32% solution of sodium hydroxide under vigorous stirring. At pH 8.0, stirring was continued for 30 min.

Colloidal hematite (134 nm diameter) was synthesized by adding 100 mL of a 0.1 $Fe(NO_3)_3$ solution to 1 L of boiling and vigorously stirred water, whereupon nanoparticles start to form in the solution.

Colloidal goethite was synthesized by dropwise adding 1.0 L of a 0.48 M solution of $NaHCO_3$ to a 1.0 L of a stirred 0.4 M solution of $Fe(NO_3)_3.9H_2O$. The suspension was then microwaved at 200 W until boiling occurred. Immediately after heating, the suspension was plunged into an ice bath until it reached 20° C. After dialysis, the pH of the suspension was quickly adjusted to pH 12 using a 5 M NaOH solution. The suspension was then heated at 90° C. for 24 h. Finally, the resulting suspension was filtered using 0.22 μm filters (MilliQ).

Colloidal akaganéite (157 nm diameter) was sythesized by preparing and sealing 100 mL of a 0.37 M aqueous ferric chloride solution in a pressure tube, which was heated to 60° C. for 18 hours. At the end of the hydrolysis reaction, a yellow precipitate had formed.

All nanoparticulate iron oxides synthesized following these methods were in stable colloidal suspension in water at the end of the respective synthesis and required no further treatment concerning stability or suspension. All chemicals used were at least ACS grade.

After synthesis, the colloidal iron oxides were cleared of residual ions and salts from the preparation. Ferrihydrite colloids were centrifuged and re-suspended in MilliQ-Water until the total carbon content in the supernaturant dropped below 1 mg/L. All other colloids were dialysed using Spectra/Por® dialyses tubes with a molecular weight cutoff of 10 kDa (available from Carl Roth, Karlsruhe, Germany). Dialysis occurred against MilliQ-Water at pH 4.0 (adjusted with 0.5 M HCL) and finally against pure MilliQ-Water until the conductivity of fresh dialysis medium did not increase anymore. All iron oxides were stored under anoxic atmosphere for 24 hrs to remove oxygen, sealed in airtight glass bottles and stored at 4° C. in the dark. Autoclaving was omitted to avoid changes in crystal structures. It was found that, at 4° C. in the dark, the colloidal iron oxides remained in suspensions for more than three months.

Bulk minerals such as goethite and hematite were obtained from Sigma-Aldrich (Deisenhofen, Germany).

Analysis of Colloidal Iron Oxides

Dynamic light scattering (DLS) was applied to measure particle sizes of the water-dispersed and diluted colloidal samples, using a ZetaSizerNano ZS and a HPPS 5001 (both Malvern Instruments, Worcestershire, UK) with low volume sizing cuvettes. At least triplicate measurements of 30 sec each were done. 80 nm calibration latex beads were measured to confirm the accurateness of the method. As DLS is an indirect measurement, the particle size was also checked by Scanning Electron Microscopy, which confirmed the data obtained by DLS of the particle sizes mentioned above.

Bulk iron oxides sizes may not be completely assessed by DLS due to fast sedimentation of the large particles. Therefore, bulk oxides were microscopically assessed using a Zeiss Axioskop 2 plus (Carl Zeiss, Jena, Germany), measuring 100 particles each at 100× magnification against a metered calibration slide, with an error assumption of 30%.

X-ray-diffraction and BET-surface measurements were performed with aliquots that had previously been frozen rapidly to −80° C., lyophilized, sealed and stored at 4° C. in a desiccator. X-ray diffraction (XRD) patterns were obtained using a Philips PW 1050 diffractometer (Philips, Eindhoven, Netherlands) equipped with a diffracted-beam graphite monochromator. A CoKα X-ray radiation beam ($\lambda$=1.7889 Å) was applied. Random powder specimen were measured from 5° to 80° 2θ in steps of 0.02° 2θ, with a counting time of 5 sec for each increment.

The specific surface area of the sample material was determined using $N_2$-physisorption at 77.35K. The calculations were performed from 11-point isotherms according to the Braunauer-Emmet-Teller equation. A Quantachrome Autosorb 1 (Syosset, N.Y., USA) was applied to perform the analysis. Before the measurement, sample material was degassed under vacuum at 35° C. overnight. This mild treatment was chosen in order to prevent structural changes of the dried iron oxides due to heating. All samples were measured at least two times with a reproducible standard deviation of less than 1% (exception bulk hematite 2.3%) of the obtained specific surface area. An $Al_2O_3$-bead standard with a specific surface area of 79.8±0.4 m$^2$/g was applied for external calibration. All measured values of the standard fell within the 95%-confidence interval. The smallest colloids surfaces (<50 nm) cannot be measured by $N_2$-physisorbtion and literature values taken from A. J. Anschutz and R. L. Penn, Geochemical Transactions 2005, 6, 60-66 were used here (see Table 1). All characteristics of the iron oxides used in this study are summarized in Table 1.

TABLE 1

Characterization of iron oxides used in microbial reduction experiments with *Geobacter sulfurreducens*

| iron oxide [specified by XRD] | state | diameter [nm] | surface area [m$^2$/g] |
|---|---|---|---|
| 6-line large ferrihydrite | colloidal | 335.7 ± 40.1 | 275 ± 0.6 |
| 6-line small ferrihydrite | colloidal | 32.6 ± 0.4 | 409 ± 74[a] |
| 6-line small ferrihydrite | colloidal | 12.2 ± 0.4 | 271 ± 49[a] |
| hematite | colloidal | 133.7 ± 23.2[b] | 100 ± 0.2 |
| akaganite | colloidal | 156.7 ± 3.4 | 219 ± 0.3 |
| goethite | colloidal | 64 ± 3.0[c] | 136 ± 0.5[a] |
| ferrihydrite | bulk | 5000 ± 1500 | 169 ± 0.3 |
| hematite | bulk | 4350 ± 1305 | 37 ± 0.9 |
| goethite | bulk | 4980 ± 1494 | 11 ± 0.1 |

[a]could not be determined by BET, taken from literature
[b]contains a small fraction of smaller particles of 7 nm.
[c]taken from literature Example 2

Microbial Reduction Experiments

Bacteria and cultivation. *Geobacter sulfurreducens* DSM No.: 12127 was obtained from the German Collection of Microorganisms and Cell Cultures (Braunschweig, Germany). The strain was cultivated using standard anaerobic techniques at 30° C. in the dark. Autoclaved, anoxic low salt medium was used throughout the study, consisting of 0.1 g/L NaCl, 4 mg/L MgCl$_2$.6H$_2$, 25 mg/L NH$_4$Cl, 50 mg/L KCl and 15 mg/L CaCl$_2$ 2H$_2$O. The medium was supplemented with trace elements solution SL10, selenite-tungsten and vitamins solutions. 10 μM Na$_2$SO$_4$ was added as sulphur source. The medium was buffered with 10 mM Tris/HCl at pH 6.8. This low-salt medium was applied to ensure colloid stability. Sodium acetate (10 mM) was added as sole energy and carbon source. All chemicals (except ferric citrate for pre-cultivation) were at least ACS grade.

Cell Suspension. Precultures were grown with 50 mM technical grade ferric citrate (pH 7.0) as electron acceptor. After growth to the late exponential phase, cells were harvested by centrifugation and resuspended in fresh medium in an anoxic glove box (O$_2$ content <3 ppm). Remaining Fe$^{2+}$ in the cell suspension was <2 mM. These cell suspensions were immediately added to the reduction experiments in a 1:10 ratio to yield final cell densities of around 2·10$^9$ cells/ml. Flow-cytometry was applied to measure the exact cell densities of the individual experiments using a LSRII (Becton Dickson Bioscience, Franklin Lakes, N.J., USA), thereby allowing a per-cell normalization of reduction rates. Paraformaldehyde-fixed cells from the cell suspensions were stained by SYBR® Green I nucleic acid stain (Molecular Probes, Eugene, Oreg., USA), diluted in 0.22 μm-filtered Dulbecco's-PBS and counted at a wavelength of 510 nm in Trucount™ bead (Becton Dickson) calibrated measurements.

Microbial reduction experiments were performed in batch incubations, initiated in anoxic (20/80% CO$_2$/N$_2$) and sterile 100 ml glass serum bottles sealed with butyl rubber stoppers. The specific colloidal or bulk iron oxides were added to the medium and the bacterial cell suspension via sterile and anoxic syringes and needles. Colloids stayed stable during the entire reaction. To test for sterility, abiotic controls were performed by adding the cell suspension through a 0.22 μm filter, thereby retaining the bacteria. Immediately after inoculation, the first samples for Fe$^{2+}$ analysis were withdrawn. From then on, the experimental vessels were shaken at 300 rpm at 30° C. in the dark. Iron reduction was assessed by Fe$^{2+}$ concentration measurements using the ferrozine assay. 0.2 ml aliquots were withdrawn from the experiment, diluted 1:10 in 1M HCL and shaken at 1400 rpm for 24 hours to remove all adsorbed Fe$^{2+}$ from iron oxide surfaces. Total iron measurements were treated with 10% v/v hydroxylamine-HCL to enforce a complete reduction of all Fe(III) to Fe$^{2+}$. Subsequently, aliquots from this preparation were diluted with ferrozine, incubated for 10 min and shaken again for 30 sec. Absorbance at 560 nm was measured using a Wallac 1420 Viktor$^3$ plate reader (Perkin Elmer, Mass., USA). Initial rates of reduction were calculated by linear regression of Fe$^{2+}$ increase vs. time. As colloid reduction proceeded rapidly and was dependent of the initial Fe(III)-concentration, the endpoint of the regression analysis was set to a time upon when 50% of the maximum Fe$^{2+}$ concentration had been produced. For the bulk ferric oxide reduction, a linear regression was calculated over the entire time span of the experiment. Error bars include the standard errors of the triplicate iron measurements, standard errors of multiple cell counts and standard deviations of the triplicate identical individual experiments.

Figure 1:
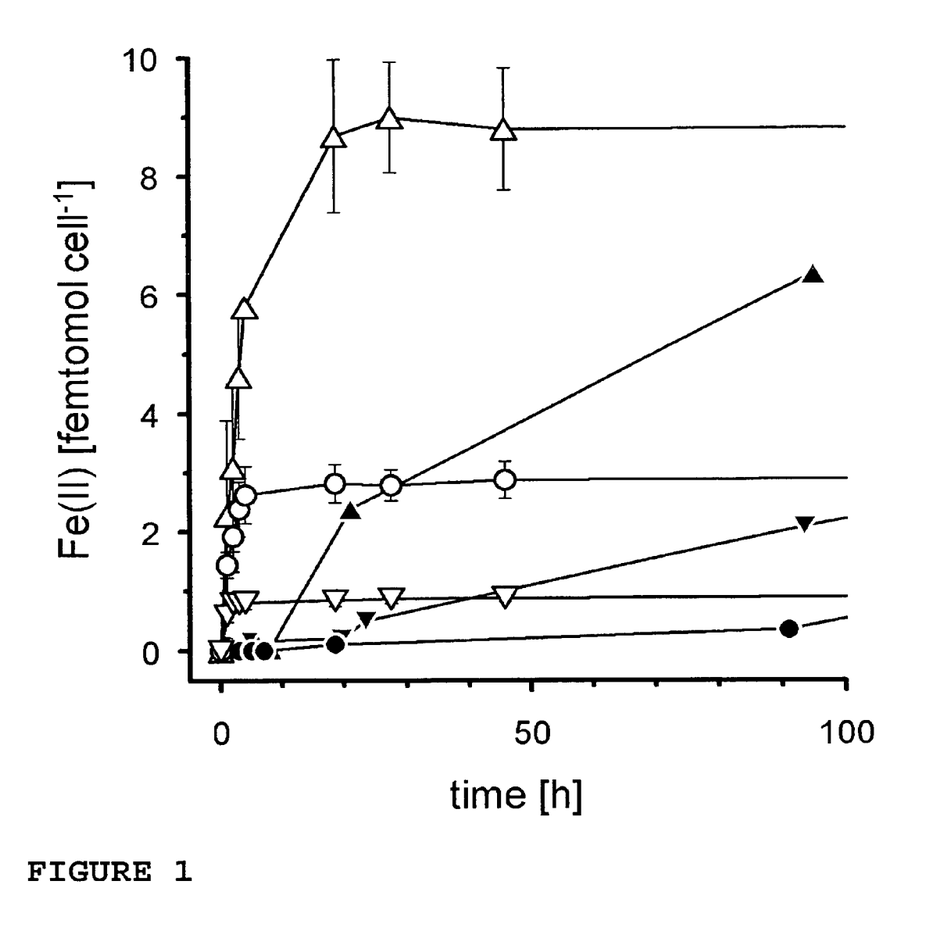
FIG. 1 shows the Fe(III) reduction of colloidal and bulk ferrihydrite by *Geobacter sulfurreducens* at different initial Fe(III) concentrations. Initial concentrations of 269-nm-ferrihydrite colloids were 0.29 mM (0.9 femtomol cell$^{-1}$, n=3, $\nabla$), 0.86 mM (2.9 femtomol cell$^{-1}$, n=3, $\bigcirc$) and 1.71 mM (9.2 femtomol cell$^{-1}$, n=3, $\Delta$), for the bulk ferrihydrite 3.52 mM (33.1 femtomol cell$^{-1}$, n=1, $\blacktriangledown$), 19.36 mM (86.7 femtomol cell$^{-1}$, n=1, $\bullet$) and 15.09 mM (170.9 femtomol cell$^{-1}$, n=1, $\blacktriangle$).
Figure 2:
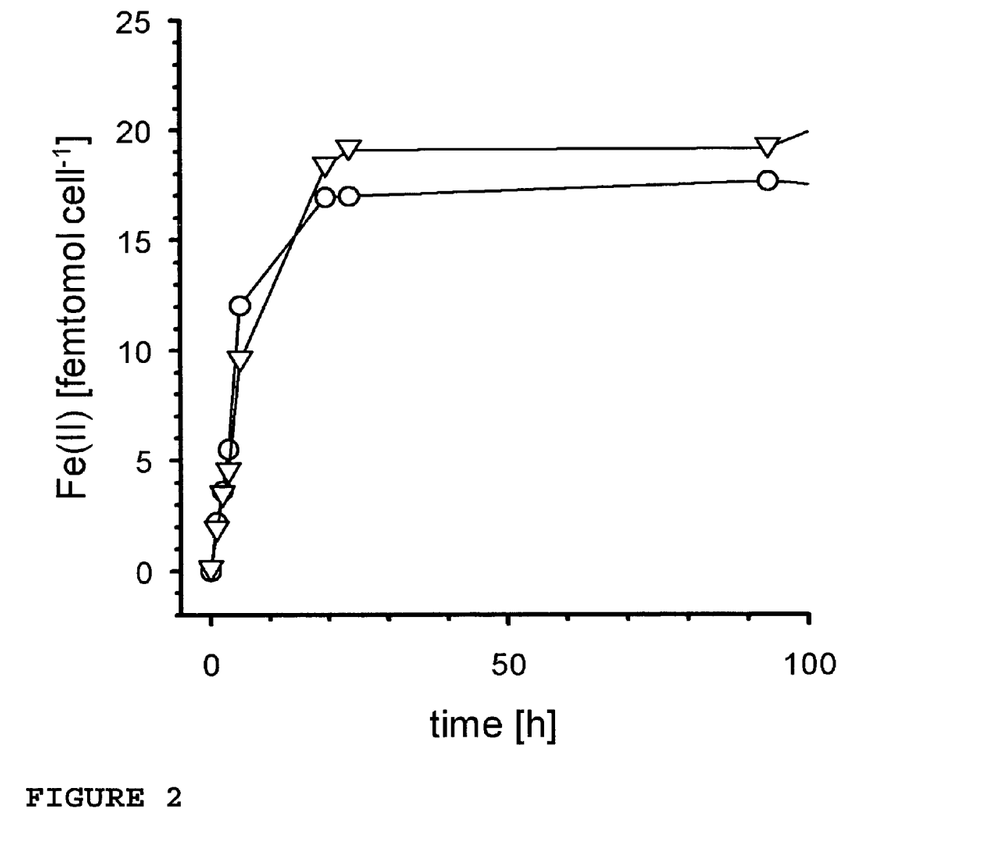
FIG. 2 shows the Fe(III) reduction of different colloidal ferrihydrite species by *Geobacter sulfurreducens* at different initial Fe(III) concentrations. Initial concentrations of 12-nm-ferrihydrite colloids were 2.51 mM (23.6 femtomol cell$^{-1}$, n=1, $\nabla$), and 25-nm ferrihydrite colloids were added at 2.21 mM (18.6 femtomol cell$^{-1}$, n=1, $\bigcirc$).

When the described iron oxide colloids were applied as electron acceptors in cell suspensions of *G. sulfurreducens*, rapid reduction occurred within the batch cell suspension experiments. For large ferrihydrite colloids with a diameter of 335.7 nm, the initial reduction kinetics was at 0.680-1.645 femtomol h$^{-1}$ cell$^{-1}$. This was up to 330 times faster than the reduction of bulk ferrihydrite with 0.005-0.067 femtomol h$^{-1}$ cell$^{-1}$ at the same concentration. The positive control ferric citrate was only up to 9 times faster, indicating that colloids are reduced with almost similar kinetics as dissolved iron complexes. Comparison of the different ferrihydrite colloids and the bulk ferrihydrite showed a clear dependence of the reduction rate on the particle size (Table 2). In order to analyze if the size dependence might have been due to the higher surface area, we normalized the reaction rate to the total surface area of the minerals added to the cultures. The surface area normalized reaction rates were strongly dependent on the particle size which remained as the only variable in the experiments. This was similar for ferrihydrite (FIGS. 1 and 2), hematite and goethite/akaganeite (not shown): *G. sulfurreducens* reduced colloidal ferrihydrite, goethite, akaganeite and hematite at maximum rates of 0.067 to 2.410 femtomol h$^{-1}$ cell$^{-1}$. Bulk maximum reduction rates in contrast ranged only from 0.005 to 0.067 (Table 2). The smallest particles at a size of 13 nm diameter reacted almost 3 orders of magnitude faster than its respective bulk phase. Additionally, when forcing colloids to coagulate, reduction rates rapidly dropped to bulk reduction levels. This further supports the finding that particle size acts as a major factor.

The kinetics of colloidal ferrihydrite reduction is the fastest among the colloids, and ferrihydrite colloids were reduced to 96.7 to 100% over the course of the experiment. In contrast, the reduction of bulk ferrihydrite proceeded almost linearly at a constantly low rate up to reduction degree of 24.9% over the time of the experiment (up to 240 hrs). Ferrihydrite has the lowest cristallinity of the iron oxides examined here. Still, to our knowledge, the microbial reduction rates of colloidal ferrihydrite measured here represent the highest rates reported so far for microbial reduction of solid ferric iron oxide phases. Surprisingly, colloidal hematite, goethite and akaganeite of the same size were also reduced to 77.8-100.0% at rates of 0.067 and 0.505-0.603 femtomol h$^{-1}$ cell$^{-1}$ ferrous iron production, as compared to colloidal ferrihydrite which was reduced at 0.680-1.645 femtomol h$^{-1}$ cell$^{-1}$. Even more, this is also the first report of akaganeite being reduced by *Geobacter* at all.

Figure 3:
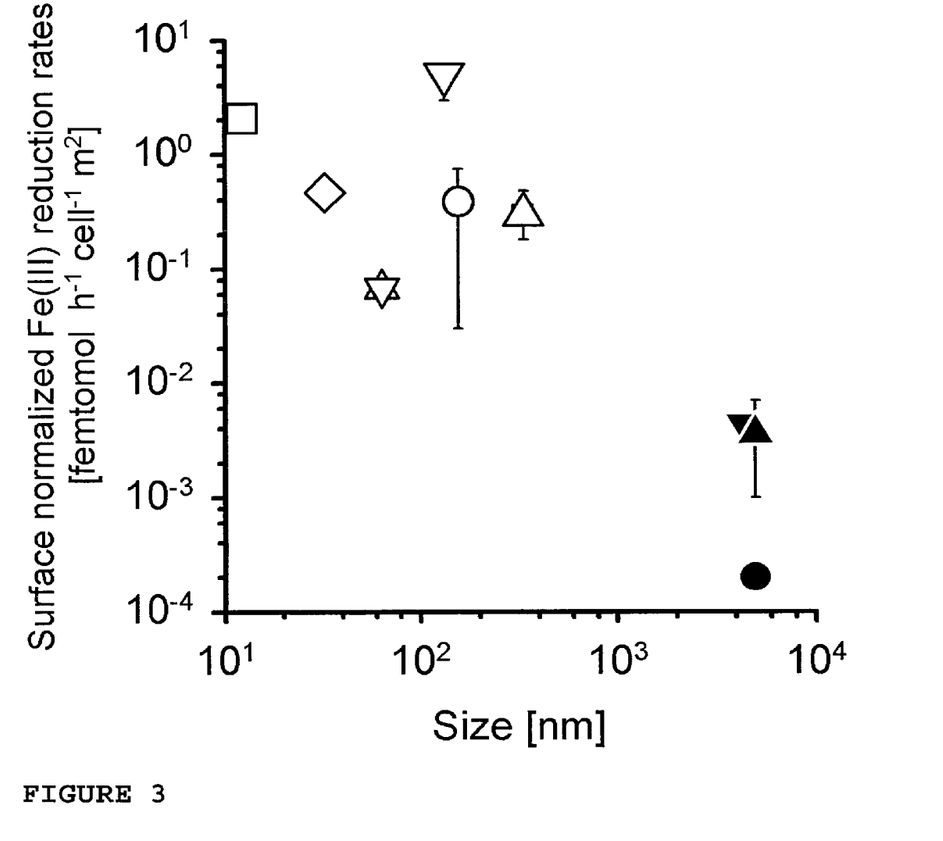
FIG. 3 shows the Surface normalized maximum reaction rates for colloidal hematite ($\nabla$), 335 nm colloidal ferrihydrite ($\Delta$), 12.2 nm ($\square$) and 32.6 nm ($\diamondsuit$) ferrihydrite colloids, colloidal akaganeite ($\bigcirc$), colloidal goethite ($\star$), bulk goethite ($\bullet$), bulk hematite ($\blacktriangledown$) and bulk ferrihydrite ($\blacktriangle$). Error bars indicate standard deviations among individual experiments.

In contrast, bulk hematite and goethite are reduced to a degree of 6.2 to 23.6%, similar to bulk ferrihydrite during the time of the experiment. Bulk hematite and goethite are generally reduced at very poor rates by microbes, if at all. Nevertheless, in colloidal state, akaganeite and hematite became excellent electron acceptors for microbial iron reduction with up to 3 orders of magnitude higher reduction rates for colloids as compared to the bulk hematite phase. Moreover, surface area normalized reaction rates of goethite and akaganeite colloids filled into the reaction rate over size correlation of the ferrihydrite colloids. This indicates that at such nanoparticle sizes, the nature of the mineral i.e. the thermodynamic stability or cristallinity has a minor effect on the reaction rate and the size of the particle and related mineralogical features become the dominant parameters of the reactivity. This is supported the extraordinary high reactivity/surface area of the hematite particles which exceeded the reactivity of the ferrihydrite colloids although bulk hematite is almost not reducible by microbes. To a certain extent, the high microbial reduction rates and the high availability of the colloidal iron oxides may be attributed to the high surface area of the nanoparticles. However, it was found that the particle size has a much higher influence on the reactivity than the surface area alone (FIG. 3).

Example 3

Catalytic Effect

Figure 4:
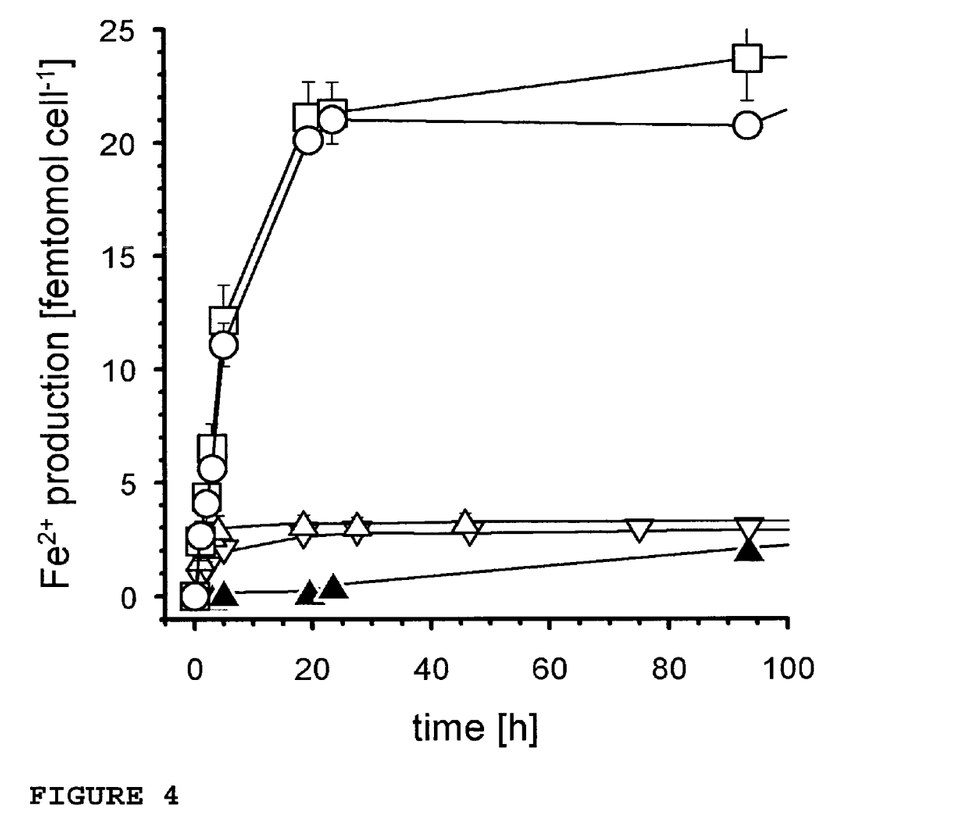
FIG. 4 shows the catalytic effect of a small amount of a colloidal iron oxide added to a large volume of bulk iron oxide. Colloidal 335.7 nm ferrihydrite was added at 0.86 mM (2.9 femtomol cell$^{-1}$, n=3, $\Delta$) and colloidal hematite at 0.64 mM (3.0 femtomol cell$^{-1}$, n=3, $\nabla$). Bulk ferrihydrite was added at 3.52 mM (33.1 femtomol cell$^{-1}$, n=1, $\blacktriangle$). Combination of bulk ferrihydrite and colloids at amounts applied in the previous, separate experiments: bulk ferrihydrite+colloidal hematite at 2.26 mM (21.6 femtomol cell$^{-1}$, n=3, $\bigcirc$), bulk ferrihydrite+colloidal ferrihydrite at 2.71 mM (25.9 femtomol cell$^{-1}$, n=3, $\square$).

Apart from the high reactivity of the colloids as electron acceptors, a stimulation of bulk ferric oxide reduction upon combination of bulk and colloidal iron oxides has been observed. When adding a catalytic amount of colloidal ferrihydrite (3.3 femtomol cell$^{-1}$) or hematite (3.0 femtomol cell$^{-1}$) to a 7-times larger volume of bulk ferrihydrite (21.6 and 25.9 femtomol cell$^{-1}$), 90.0% (with colloidal hematite) and 85.0% (with colloidal ferrihydrite) of the bulk mineral was reduced (FIG. 4). This is 3 to 4 times more than the maximum reduction detected for sole bulk ferrihydrite alone, which was reduced to only 24.9% within the period of the experiment (Table 2). Clearly, a catalytic effect is enforced by the colloids and the bulk, inert iron oxide becomes readily available to the microorganisms. The maximum reduction rates amounted to 2.215 and 2.428 femtomol h$^{-1}$ cell$^{-1}$, respectively, and were in the upper range of colloidal reduction rates (0.133-2.410 femtomol h$^{-1}$ cell$^{-1}$), as compared to the bulk ferrihydrite reduction rate of 0.005-0.067 femtomol h$^{-1}$.

The data show that addition of either ferrihydrite or hematite colloids to bulk ferrihydrite phases enhance the kinetics of the reduction of bulk ferrihydrite by a factor of 63.9 and 58.3, respectively.

TABLE 2

Degree of iron reduction at the end of the experiment and maximum reaction rates for the individual experiments at different initial Fe(III) concentrations.

| iron oxide | initial Fe (III) concentration [femtomol cell$^{-1}$] | Reduced [%] | Max reduction rate [femtomol h$^{-1}$ cell$^{-1}$] |
|---|---|---|---|
| ferric citrate | 86.3 | 85.6 | 6.106 |
| 12 nm ferrihydrite | 18.6 | 83.9 | 0.939 |
| 32 nm ferrihydrite | 23.6 | 86.2 | 2.410 |
| 335 nm ferrihydrite | 0.9 | 100.0 | 0.680 |
| 335 nm ferrihydrite | 2.9 | 100.0 | 1.094 |
| 335 nm ferrihydrite | 9.2 | 96.7 | 1.645 |
| bulk ferrihydrite | 33.1 | 24.9 | 0.041 |
| bulk ferrihydrite | 86.7 | 1.0 | 0.005 |
| bulk ferrihydrite | 170.9 | 3.7 | 0.067 |
| colloidal hematite | 3.0 | 100.0 | 0.505 |
| colloidal hematite | 5.9 | 100.0 | 0.603 |
| colloidal hematite | 16.5 | 84.0 | 0.334 |
| bulk hematite | 13.4 | 6.2 | 0.017 |
| bulk hematite | 69.3 | 11.4 | 0.049 |
| colloidal goethite | 1.49 | 80.5 | 0.067 |
| colloidal akaganeite | 12.0 | 97.5 | 0.133 |
| colloidal akaganeite | 21.4 | 77.8 | 1.649 |
| bulk goethite | 3.7 | 23.6 | 0.009 |

INDUSTRIAL APPLICABILITY

The present invention provides a method for the biological remediation of sites polluted with hydrocarbons, which is versatile, universally applicable, easy to use and cost-efficient, without requiring to further strain the already polluted environment. Moreover, the present invention provides a method for forming a biobarrier against the further spreading of a contamination, especially in an aquifer or in a sediment. Moreover, the present invention provides colloidal suspensions for use in the remediation of polluted sites and for use in the formation of a biobarrier in an aquifer or in a sediment, as well as a method for the production of such colloidal suspensions.

The invention claimed is:

1. A method for the oxidative degradation of aliphatic or aromatic hydrocarbons in water, soil or a mixture thereof comprising:
   contacting a microorganism with colloidal particles and activating those colloidal particles by transferring at least one electron from the microorganism to the colloidal particles; and
   then contacting aliphatic or aromatic hydrocarbons in water, soil or a mixture thereof with the colloidal particles consisting of at least one metal oxide that oxidizes the aliphatic or aromatic hydrocarbons to a corresponding alcohol, aldehyde, carbon acid, acetate, carbon dioxide or carbonic acid,
   wherein the colloidal particles are a monodisperse metal oxide crystal or an aggregate of metal oxide particles, wherein the metal oxide consists of:
   (a) an iron oxide selected from the group consisting of an iron oxide, an iron oxyhydroxide and an iron oxide-hydroxide/chloride, or
   (b) a mixed oxide, wherein the mixed oxide is:
   (i) an iron oxide selected from the group consisting of an iron oxide, an iron oxyhydroxide and an iron oxide-hydroxide/chloride, and
   (ii) at least one of the group consisting of aluminum oxide, manganese oxide, and silicon oxide,
   wherein iron cations of the iron oxide are in the oxidation state +2, +3, or a combination of +2 and +3,
   wherein the colloidal particles have a particle size from 1 to 200 nm.

2. The method of claim 1, wherein the colloidal particles are in a colloidal suspension comprising water.

3. The method of claim 1, wherein the colloidal particles are brought into contact with the water, soil, or a mixture thereof by means of mixing, active transport, passive transport, or a combination thereof.

4. The method of claim 3, wherein the active transport comprises pumping of the colloidal particles into the water, soil, or a mixture thereof.

5. The method of claim 1, wherein the colloidal particles consist of iron oxide particles having a particle size of from 1 to 500 nm and the colloidal particles are brought into contact with the water, soil, or mixture by means of pumping the colloidal particles into the water, soil, or mixture.

6. The method of claim 1, wherein the colloidal particles enhance the availability of other mineral electron acceptors present in the water, soil, or mixture.

7. The method of claim 6, wherein the other mineral electron acceptors comprise bulk metal oxides.

8. The method of claim 1, wherein the colloidal particles form a biobarrier in the water, soil, or mixture.

* * * * *

UNITED STATES PATENT AND TRADEMARK OFFICE
CERTIFICATE OF CORRECTION

| | | |
|---|---|---|
| PATENT NO. | : 8,921,091 B2 | Page 1 of 1 |
| APPLICATION NO. | : 13/061587 | |
| DATED | : December 30, 2014 | |
| INVENTOR(S) | : Mechenstock et al. | |

It is certified that error appears in the above-identified patent and that said Letters Patent is hereby corrected as shown below:

On the Title Page,

Item [73] delete "Unwelt"
Item [73] insert --Umwelt--

Item [30] delete "08015396"
Item [30] insert --08015396.8--

In the Claims,

Column 20, line 6, Claim 1 delete "200 nm"
and insert --2,000 nm--

Signed and Sealed this
Third Day of March, 2015

Michelle K. Lee
*Deputy Director of the United States Patent and Trademark Office*